UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

PROCESS OF TREATING AND PRODUCTS DERIVED FROM VEGETABLE FIBERS.

SPECIFICATION forming part of Letters Patent No. 543,986, dated August 6, 1895.

Application filed October 20, 1882. Serial No. 74,785. (No specimens.)

*To all whom it may concern:*

Be it known that I, THOMAS A. EDISON, of Menlo Park, in the county of Middlesex and State of New Jersey, have invented a new and useful Improvement in Processes of Treating and in Products Derived from Vegetable Fibers, (Case No. 498,) of which the following is a specification.

The object of my invention is to produce by a simple and economical process a new material adapted for uses similar to those for which hard rubber and vulcanized fiber have been employed, but which may also be used for other purposes.

I have found that by treating fibrous vegetable materials of any kind with strong hydrofluoric acid a remarkable chemical change takes place in the structure of such material, the result being a transparent or translucent, tough, pliable substance, which is capable of being formed into any desired shape, and is adapted for many different uses. This process is one quite distinct from that of parchmentizing or vulcanizing vegetable fiber by the use of sulphuric acid or chloride of zinc, the resulting products being entirely different.

My process is also much simpler than the parchmentizing or vulcanizing process.

The fiber after being washed and dissolved in the acid does not require treatment with an alkali to remove the acid from it, as that portion of the acid which cannot be pressed out of the mass will gradually distill off, this property being one peculiar to hydrofluoric acid, which, being merely a volatile gas dissolved in water, is readily evaporable.

The preferable process consists in soaking the fibrous material, which may be a sheet or sheets of paper, a wooden board, a strip or filament of bamboo or similar material, or a thread of cotton or flax; in short, any fibrous vegetable material in the acid, when a substace is produced of transparent jelly-like appearance, but tough and flexible, impervious to water, and a good electrical insulator, and also carbonizable.

Where a mass of fibrous material is treated, the gelatinized substance should be pressed into sheets by powerful pressure, the acid being thus almost entirely removed, and from these sheets pieces of any desired shape may be cut, punched, rolled, or otherwise formed. To make blocks of this substance similar to the blocks of vulcanized fiber in ordinary use, a number of sheets of paper may be laid together, soaked with the acid, and afterward pressed. It is evident that this substance is suitable for a great variety of uses, notably those for which hard rubber, vulcanized fiber, and even leather have hitherto been employed. It is especially adapted for use as an electrically-insulating material, and also for forming, after carbonization, flexible high-resistance filaments for use as the incandescing conductors of electric lamps. It is also evident that any form whatever of vegetable fiber may be subjected to this process, even those containing resin, which cannot be parchmentized to any extent, the presence of resinous material making no difference in the action of hydrofluoric acid.

What I claim is—

1. As a new article of manufacture, the transparent or translucent flexible material formed by treating vegetable fiber with hydrofluoric acid, substantially as set forth.

2. The process of converting vegetable fiber into a flexible, transparent or translucent substance, consisting in treating such fiber with hydrofluoric acid, substantially as set forth.

3. The process of forming flexible, transparent or translucent sheets, from vegetable fiber, consisting in treating such fiber with hydrofluoric acid and pressing the resulting material into sheets, substantially as set forth.

This specification signed and witnessed this 17th day of October, 1882.

THOS. A. EDISON.

Witnesses:
H. W. SEELY,
RICHD. N. DYER.